United States Patent [19]

Daghe et al.

[11] 4,407,482
[45] Oct. 4, 1983

[54] COUPLING JOINT FOR TELESCOPING TUBULAR MEMBERS

[75] Inventors: Joseph L. Daghe, Decatur; Robert E. Sands, Shelbyville, both of Ill.

[73] Assignee: Mueller Co., Decatur, Ill.

[21] Appl. No.: 210,534

[22] Filed: Nov. 25, 1980

[51] Int. Cl.³ .......................... F15K 51/00; F16L 25/00
[52] U.S. Cl. ................................. 251/148; 285/334.1; 285/334.5; 285/351; 285/321; 285/DIG. 18
[58] Field of Search ................. 285/334.5, 344, 334.1, 285/351, 305, 321, 350, DIG. 18, DIG. 7; 251/148; 277/164, 207 A

[56] References Cited

U.S. PATENT DOCUMENTS

| | | | |
|---|---|---|---|
| 1,502,673 | 7/1924 | Hole | 285/344 X |
| 2,017,362 | 10/1935 | Werder | 285/334.1 |
| 2,413,106 | 12/1946 | Kelle | 285/321 X |
| 2,735,505 | 2/1956 | Kleiman | 285/321 X |
| 2,993,677 | 7/1961 | Ford | 251/148 |
| 3,079,188 | 2/1963 | Oswold | 285/321 X |
| 3,143,845 | 8/1964 | Binford | 285/321 X |
| 3,182,918 | 5/1965 | Shive | 285/DIG. 22 |
| 3,246,674 | 4/1966 | Kapeker | 285/177 X |
| 3,304,104 | 2/1967 | Wiltse | 285/5 |
| 3,445,120 | 5/1969 | Barr | 285/231 X |
| 3,667,785 | 6/1972 | Kapeker | 285/321 X |
| 4,085,951 | 4/1978 | Morris | 285/351 X |
| 4,281,601 | 7/1979 | Overman | 285/321 X |

FOREIGN PATENT DOCUMENTS 543733 3/1942 United Kingdom ............... 285/305

Primary Examiner—Dave W. Arola
Attorney, Agent, or Firm—Cushman, Darby & Cushman

[57] ABSTRACT

A coupling joint for releasably coupling two telescoping tubular members in sealing relationship to one another, one of the tubular members being continuously urged inwardly relative to the other tubular member whereby a seal between said members may be maintained at all times. The coupling joint, which may be utilized in a valve or the like with the valve body representing one of the tubular members and a bushing representing the other of the tubular members inserted into the open end of the valve body, includes the use of a resilient ring such as an O-ring for retaining the two tubular members together, the ring being positioned in opposed grooves in the telescoped portion of the tubular members. One of the grooves on one of the tubular members is a retaining ring groove for retaining the resilient ring during assembly of the two tubular members, and the other of the grooves on the other of the tubular members is a groove having a camming surface thereon so oriented that when the grooves are opposed to one another with the resilient ring therebetween, the compressive forces in the resilient ring seeking to expand the same exert resultant forces on the tubular members to cause said tubular members to be urged toward one another.

26 Claims, 9 Drawing Figures

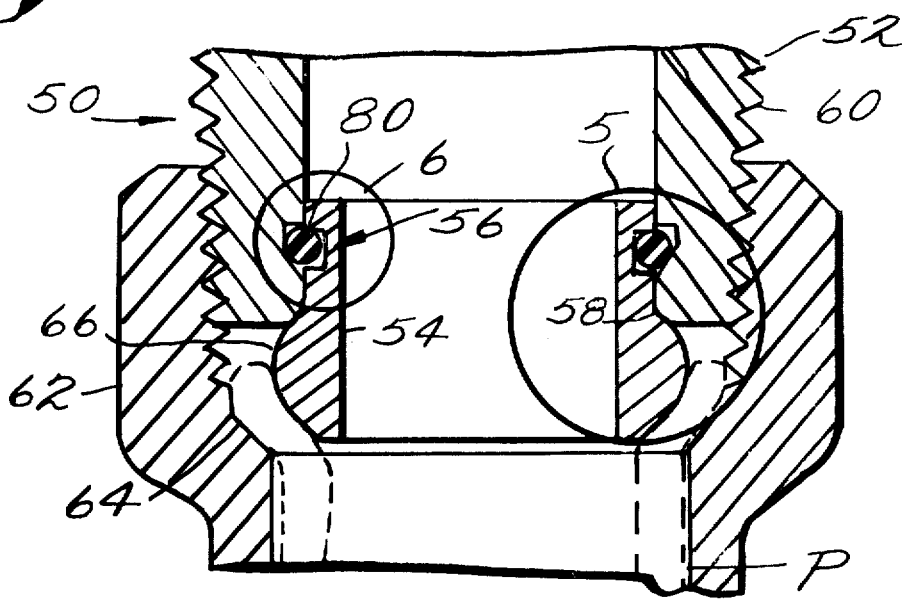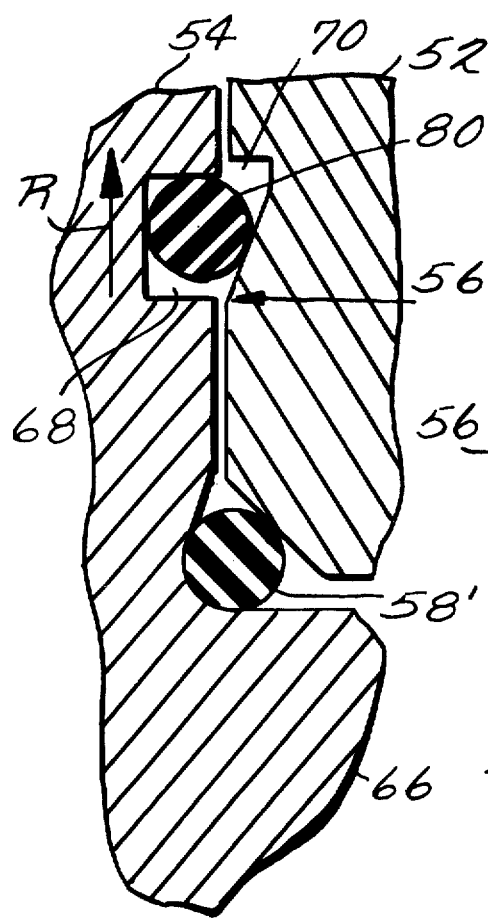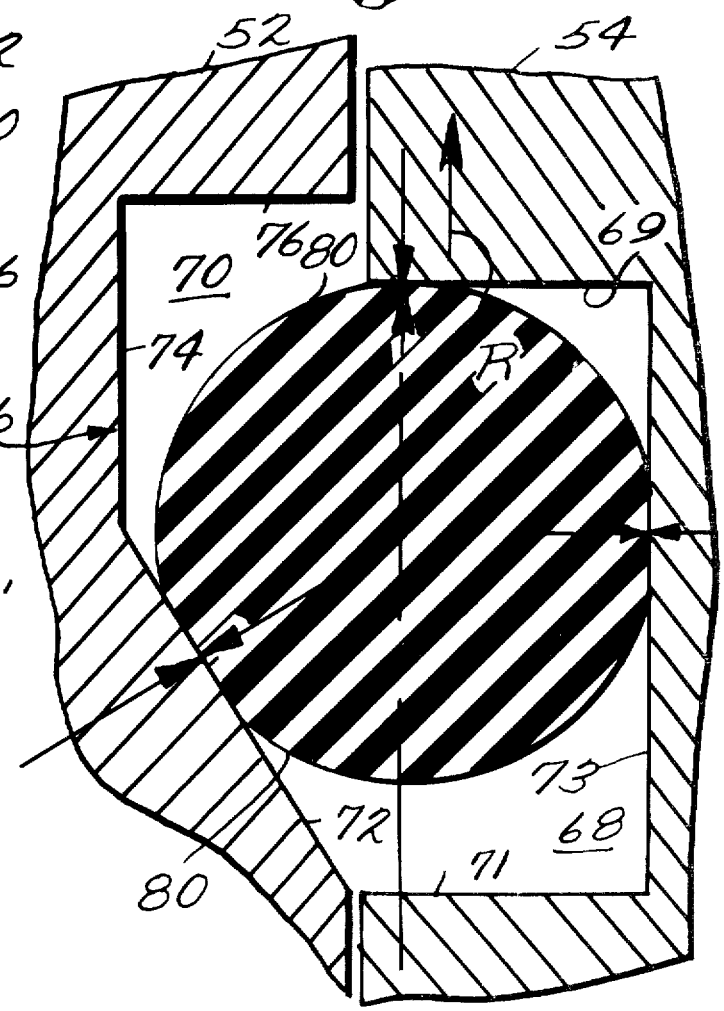

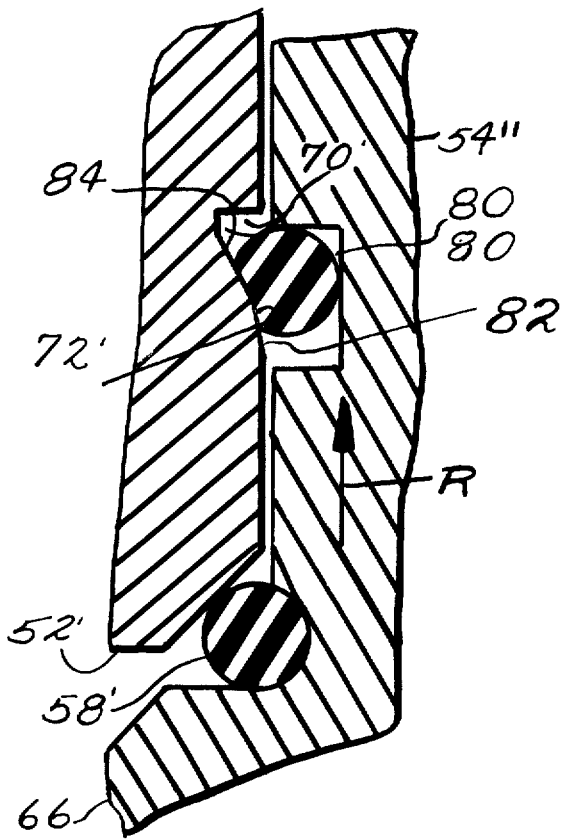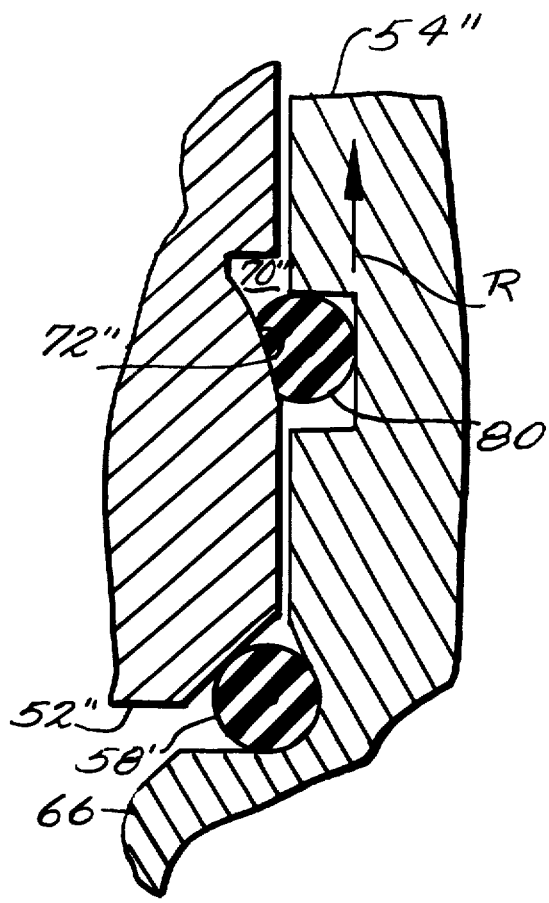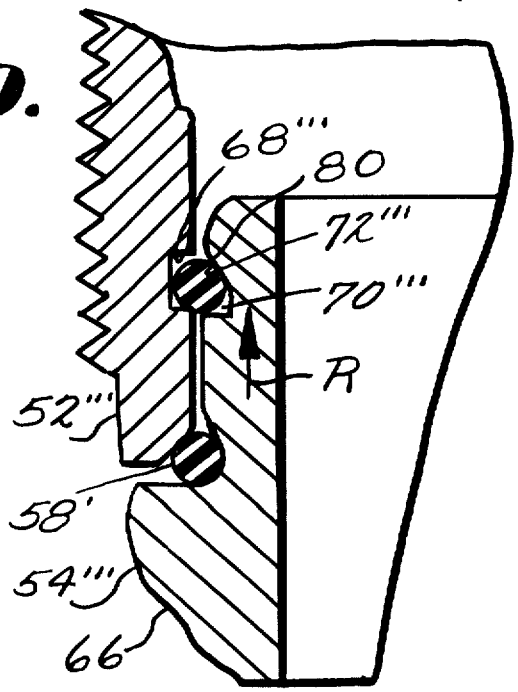

4,407,482

COUPLING JOINT FOR TELESCOPING TUBULAR MEMBERS

The present invention relates to improvements in a coupling joint for two telescoping tubular members which permit the members to be releasably connected and which further provide a resultant force continuously urging the two tubular members toward one another. More particularly, the improvement in coupling joint is adapted for use in valve designs wherein the valve body includes a valve key or plug having a flow passage therethrough, the plug being inserted therein through an opening in the valve body. A bushing is required in the opening in the valve body to conform the diameter of the opening to the inside diameter of the passageway through the key and to the tubing connected to the valve. The valve body represents a first tubular member, and the bushing represents a second tubular member inserted at least part way into the first tubular member. By utilizing the bushing, tubulence within the valve is reduced and uniform flow therethrough may be maintained.

While the present invention will be described in connection with a valve design, it will be appreciated by those skilled in the art, the invention could be used in other situations where it is desired to provisionally retain two telescoping tubular members to each and then subsequently connect a flared tube in sealing engagement with one of the tubular members. Such an arrangement would still provide for bushing removal without special tools, for replacement of seals and/or for interchangeability with different bushing designs.

BACKGROUND OF THE INVENTION

Manufacturers today have produced valves for the water and gas distribution fields which utilize a valve body and a rotatable valve element known in the trade as a "plug" or "key," the valve element having a flow passage therethrough. In such valve assemblies, especially where a tapered plug or key is used, it is often necessary to insert a tubular bushing into the open end of the valve body through which the plug or key is inserted, the purpose of the bushing being to conform the inside diameter of the valve body as close as possible to the inside diameter of the passage through the plug as well as to the inside diameter to the tubing or pipe to which the valve is to be connected. Additionally, the bushing is used as a backup for engaging or forming the flared end of a pipe when a coupling nut is used.

One type of valve construction such as heretofore described is shown in the U.S. Pat. No. 2,993,677, issued July 25, 1961, to John L. Ford. In this construction, a tubular bushing was press fitted into the open end of the valve body after insertion of the plug or key, the bushing being provided with an enlargement on the end portion extending outwardly of the body, the enlargement being arranged to abuttingly engage the end of the valve body to make a seal. When such a valve was assembled, and if there was subsequent damage to the valve plug or to the seal between the bushing and the body when the bushing was press fitted into the plug, then the valve could not be repaired but had to be thrown away. Additionally, if a bushing of different design or having a different interior diameter was needed, the whole assembled unit had to be discarded.

A more recent development in valve construction for the plug or key type valve included using a bushing which tapered inwardly from an enlarged head portion, the bushing being provided with an annular flange on its inner end of less diameter than the diameter of the opening in the valve body. Such a bushing was freely inserted into position in the valve body so that its flanged inner end was positioned opposite an annular groove provided on the interior wall of the opening in the valve body and, when in this position, the bushing was flared outwardly so that the flange was received in the groove in the valve body. This arrangement provided a rather loosely retained bushing with a seal ultimately being made by metal-to-metal contact between the enlarged outer end of the bushing and the end of the valve body or by an O-ring positioned between the enlarged outer end of the bushing and the end of the valve body when a coupling nut was used to retain the flared end of copper or plastic tubing. Since manufacturing tolerances require the groove in the valve body for receiving the flange of the bushing to be wide in comparison to the flange or retaining lip, there was a loose fit between the valve body and the bushing until a connection, such as a flared connection, had been made. This arrangement had the disadvantage in that it allowed dirt to get between the sealing surfaces and also between the bushing and the valve body prior to installation and, further, once the bushing had been installed in the valve body, it could not be removed and replaced for maintenance or other purposes, just as in the case of the valve construction shown in the aforementioned U.S. Pat. No. 2,993,667.

Heretofore, two tubular bodies have been coupled together by providing a resilient ring between the telescoping bodies, the resilient ring being received in opposed grooves, but the grooves were of such a shape as to either permanently retain the telescoping member together or they required the telescoping members to be tilted at an angle from one another to join or remove the same. In this respect, no thought was given to utilize the resilient ring as merely a provisional retaining means for holding the bushing in the valve body with its outer enlarged end tightly against the end of the valve body prior to the tightening of a coupling nut.

PRIOR ART

Prior art on this subject is represented by the following patents which disclose various couplings for telescoping tubular members:

| | U.S. Pat. Nos. | |
|---|---|---|
| 3,143,845 | Binford | Aug. 11, 1964 |
| 3,182,918 | Shive | May 11, 1965 |
| 3,246,674 | Kapeker | April 19, 1966 |
| 3,304,104 | Wiltse | Feb. 14, 1967 |
| 3,445,120 | Barr | May 20, 1969 |
| 3,667,785 | Kapeker | June 6, 1972 |
| | Foreign Patents | |
| British 543,733 | M'Caw | March 10, 1942 |

In the disclosures of the above patents, and in particular the patents to Binford U.S. Pat. No. 3,143,845, Shive U.S. Pat. No. 3,182,918 and M'Caw British Pat. No. 543,733, there is disclosed telescoping tubular members, the members having annular grooves therein which oppose one another, the grooves arranged to receive a resilient retaining ring for holding the two members together. However, in these patents there is not disclosure of shaping one of the O-ring grooves in a particular manner wherein the tubular members are urged or cammed axially relative one another by the resultant forces caused thereon by the resilient retaining ring to maintain a tight fit. Further, the disclosures of these patents do not teach taking into account manufacturing tolerances in the retaining ring or in the grooves for receiving the retaining ring.

The Kapeker U.S. Pat. Nos. 3,246,674 and 3,667,785 disclose coupling joints for tubular members made primarily of glass, the tubular members being retained in position by a resilient ring carried between opposed annular grooves in the tubular members. Again, the disclosures of the Kapeker patents do not teach shaping of the groove in one of the elements in such a manner as to retain the two parts together in a tight fit with the parts being cammed or urged toward one another by the resilient retaining ring. Further, in assembling or disassembling the coupling, it is required in Kapeker U.S. Pat. No. 3,667,785 that the tubular members be tilted relative to one another to avoid breaking of the tubular members.

The Wiltse U.S. Pat. No. 3,304,104 provides a groove in only one of the telescoping tubular members, and this groove has a radial cross-sectional configuration with sloping tapered walls, but these walls do not function to cause the resilient ring, when under compressive forces, to urge or cam the tubular members relative or toward one another but are merely so shaped to conform to the particular radial cross-section of the resilient retaining ring.

The Barr U.S. Pat. No. 3,445,120 discloses a wedge sealing gasket and joint for telescoping tubular members, the gasket or ring having a stiffening means therein and the groove in one of the members having sloping walls on which the resilient ring can roll in assembly or disassembly of the coupling joint. The disclosure does not recognize the problem of maintaining a tight axial fit with the two tubular elements being normally urged axially toward one another but still capable of being easily disassembled.

BRIEF SUMMARY OF THE INVENTION

In its broadest aspect, the present invention relates to an improvement in a coupling joint for telescoping tubular members of a fluid distribution system and, more particularly, to a first tubular member and a second tubular member insertable at least part way within the first tubular member, the tubular members having annular grooves thereon which oppose one another when the members are in telescoping relationship. A resilient ring is positioned in the first and second annular grooves when the same are opposed to one another for retaining the tubular members in telescoping relationship, the first and second annular grooves having a radial cross-sectional area, when opposed, small enough to exert compressive forces on the resilient ring. A camming surface is provided in one of the grooves which engages the resilient ring and causes the first and second tubular members to be urged in an axial direction relative to one another when the resilient ring seeks to expand in the grooves and acts against the camming surface.

The camming surface in the one of the grooves of the tubular members is a diverging annular wall which faces in an axial direction such as to cause the retaining ring, when compressed between the first and second annular grooves, to seek to expand and to exert resultant forces on the first and second tubular members so as to urge the second tubular member inwardly of the first tubular member.

To further enhance the coupling joint, the second tubular member, which has an end portion projecting from the first tubular member, has an annular enlargement on the end portion of greater diameter than the interior diameter of the first tubular member, and sealing means are provided between the annular enlargement and the first tubular member. This sealing means may be a metal-to-metal seal between the enlargement and the end of the first tubular member or it may be a sealing ring positioned between the two members, and because the two members are normally urged toward each other, the sealing means prevents dirt or debris from entering between the two members and possibly interfering with the primary sealing means therebetween or interfering with the resilient retaining ring which functions as a secondary sealing means. The present arrangement eliminates dirt being trapped between the primary and secondary seals prior to completion of the joint, and, thus the problem of dirt being crushed during tightening or washed out at a later time is eliminated so there is no reduction in sealing force which possibly could cause leaks.

When the diverging annular wall in one of the annular grooves is in that groove which is in the first tubular member, it faces outwardly of the first tubular member, and when the diverging annular wall is in the groove of the second tubular member, it faces inwardly of the coupling joint so that in each instance the first and second tubular members are urged in an axial direction toward one another as the resilient ring seeks to expand in the opposed grooves. The diverging annular wall may be frusto-conical and extend at an acute angle to the axes of the tubular members in a range of 4° to 45°, and preferably no more than 36° with the optimum angle being in the order of 18°, or it may be made up of two frusto-conical walls, or it may be convexly curved.

Ancillary to the above, the coupling joint of the present invention may be used for coupling a pipe having a flared end to the joint, and it may also form part of a valve construction.

These and other features and advantages of the present invention will appear more fully in the following Brief Description of the Drawings and Detailed Description of the invention.

BRIEF DESCRIPTION OF THE DRAWINGS

FIG. 4 is an enlarged fragmentary vertical sectional view through the coupling joint of the present invention;

FIG. 5 is an enlarged fragmentary sectional view of the portion encircled in FIG. 4 and identified as 5, the view showing a modified sealing arrangement between the inner tubular member or bushing and the outer tubular member or body;

FIG. 6 is an enlarged fragmentary sectional view of the portion encircled in FIG. 4 and identified as 6, the view illustrating the triplanar compressive forces on the resilient retaining ring and the resultant forces thereof which urge the second or inner tubular member inwardly of the first or outer tubular member;

FIG. 7 is a fragmentary sectional view similar to FIG. 6 but illustrating a first modified form of diverging annular wall or shoulder for one of the annular grooves in one of the tubular members;

FIG. 8 is a cross-sectional view similar to FIG. 7 but illustrating a still further modified form of diverging annular wall or shoulder for one of the annular grooves in one of the tubular members; and FIG. 9 is a fragmentary sectional view of a modification of the present invention wherein the diverging annular wall or shoulder of the groove is on the groove in the inner or second tubular member.

DETAILED DESCRIPTION OF THE INVENTION

Figure 1:
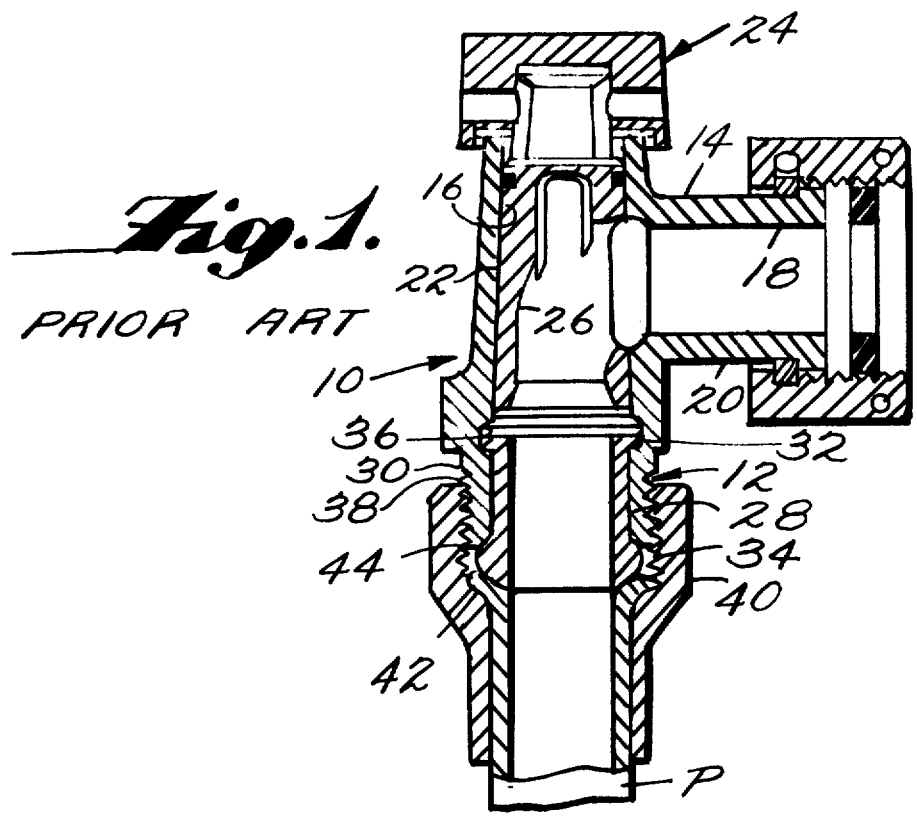
FIG. 1 is a sectional view of an angle valve construction incorporating a coupling joint for telescoping tubular members made in accordance with the prior art.

Referring now to the drawings wherein like characters or like reference numerals represent like or similar parts, and in particular to FIG. 1, there is disclosed an angle valve generally designated at 10, the angle valve being particularly adapted for use with the present invention. However, the angle valve shown in FIG. 1 discloses a coupling joint generally designated at 12 of the type used in the prior art. While the coupling joint of the present invention will be described in connection with an angle valve, such as the angle valve 10, it will be understood by those skilled in the art that there are many other uses for the coupling joint other than in angle valves, and it may be used wherever it is necessary to couple together two telescoping members in a fluid distribution system or the like.

The angle valve 10 includes a valve body member 14 having a tapered bore 16 through a portion thereof which communicates with a transverse bore 18 in a leg 20. The tapered bore is arranged to receive a tapered valve element or key 22 through its larger end, the tapered valve body being retained in the bore 16 by retaining and valve operating means generally designated at 24. A passageway 26 is provided through the tapered valve body 22, the passageway being selectively in communication with the inlet and outlet of the valve body when the valve retaining and operating means 24 is actuated.

In order to provide for smooth flow through the valve element from a tube or pipe connected thereto, a tubular bushing 28 has been provided in the end portion of the valve body, the end portion being hereinafter referred to as the first tubular member and identified by the numeral 30. In this respect, the bushing 28 will be referred to in the specification hereinafter as the second tubular member which is arranged to telescope within the first tubular member 30 and to provide a flow passage conforming to the inside diameter of a pipe P connected to the valve and to the inside diameter of the flow passage 28 so as to avoid abrupt changes in the direction of flow of fluid into the valve element or key 22, thereby reducing turbulence within the valve.

Figure 2:
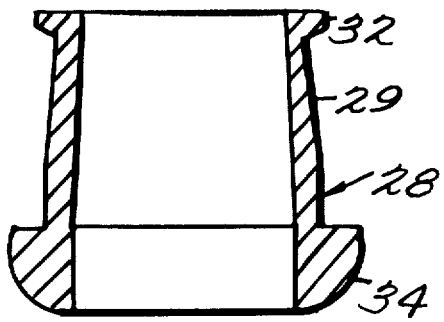
FIG. 2 is an enlarged sectional view disclosing the bushing member or inner telescoping tubular member used in the prior art coupling joint arrangement and prior to its insertion into the outer tubular member.

As heretofore mentioned in the introductory portion of the specification, the second tubular member 28 could be held in position within the first tubular member by a press fit such as shown in the aforementioned Ford U.S. Pat. No. 2,993,677. Also, the second tubular member has in the past been retained in the first tubular member by the arrangement shown in FIGS. 1 to 3, inclusive. In this arrangment, the second tubular member 28 is initially formed as shown in FIG. 2 with a slight inward taper terminating at one end in a circumferential flange or shoulder 32 having an outside diameter slightly less than the inside diameter of the first tubular member 30. The second tubular member 28 was provided at its other end with an enlarged annular shoulder 34 of a diameter greater than the inside diameter of the first tubular member 30. The bore of the first tubular member 30 was provided with an internal annular groove 36, the groove 36 being arranged to receive the flange or shoulder 32 when the bushing or second tubular member 28 was inserted into the first tubular member 30 and after insertion, its tubular body portion 29 had been expanded radially outwardly. The groove 36 had to have a sufficient axial dimension to accommodate manufacturing tolerances, and when the second tubular member 28 was positioned in the first tubular member 30 with its flange 32 in the groove 36, the second tubular member was rather loosely retained in the first tubular member.

Figure 3:
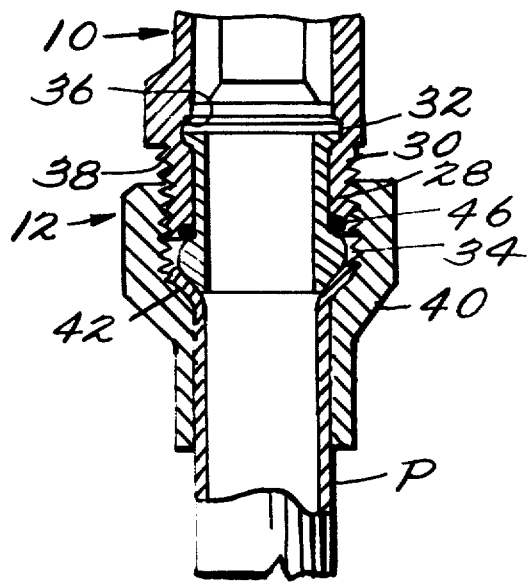
FIG. 3 is a prior art arrangement similar to FIG. 1 but illustrating use of a resilient sealing ring between one tubular member and the other rather than a metal-to-metal seal.

Threads 38 were provided on the exterior of the first tubular member 30 for receiving a tubular coupling nut 40 which was arranged to retain the flared end 42 of a tube or pipe P. When the coupling nut 40 was installed, a metal-to-metal seal resulted at 44, but this could only be used when the pipe P was metal, otherwise the torques necessary for the nut to obtain the metal-to-metal seal would be too high to use plastic tubing having a flared end as the flared end would be damaged or weakened by too much extrusion. If the tubing P is plastic, a sealing ring 46 was provided between the enlarged annular shoulder 34 and the end of the first tubular member 30, as shown in FIG. 3.

The arrangement of retaining the bushing or second tubular member 28 in the first tubular member 30 encountered the same problems as encountered in the arrangement disclosed in the aforementioned Ford U.S. Pat. No. 2,993,677 in that once the second tubular member had either been press fit into place or expanded into place, it could not be removed for servicing of the valve or replacement with a second tubular member of a different interior design. Additionally, in the situation where the second tubular member 28 was loosely held in the first tubular member, dirt and debris could work between the two tubular members and possibly affect operation of the valve.

Referring now to FIGS. 4 to 6, inclusive, the coupling joint 50 of the present invention is disclosed, and it includes a first tubular member 52 which could form a portion of a valve body such as the valve body 14 and a second tubular member 54 which functions the same as the bushing or second tubular member 28 previously described. Additionally, the coupling joint 50 includes means generally designated at 56 for releasably connecting the telescoping coupling members 52 and 54 together, the means 56 also functioning as a secondary seal between the first and second tubular members 52 and 54, respectively. An annular seal generally designated at 58 is provided between the first or outer tubular member 52 and the portion of the second or inner telescoping tubular member 54 which extends out of the first member, the seal 58 being a metal-to-metal seal as shown in FIG. 4, or, if desired, a resilient ring seal 58' such as an O-ring as shown in FIG. 5. The first tubular member is externally threaded as indicated at 60 for receiving the coupling nut 62 which clamps a flared end 64 of the pipe P between it and an annular enlargement or shoulder 66 on the portion of the second tubular member extending out of the first tubular member.

As better shown in FIGS. 5 and 6, the means 56 for releasably connecting the first tubular member 52 and the second tubular member 54 is so designed as to continuously urge the second tubular member 54 in an inward direction to cause its annular enlargement or shoulder 66 to abut with and stay abutted against the end of the first tubular member 50. In this respect, the bushing or second tubular member 54 is provided on its exterior portion with an annular groove 68 rectangular in axial cross-section and defined by a first radial wall 69 separated from a second radial wall 71 by bottom wall 73. Additionally, the interior surface of the first tubular member 52 is provided with an annular groove 70 which is defined by a diverging wall 72, a bottom wall 74 and a radially extending wall 76. The grooves 68 and 70 oppose one another when the second tubular member is properly inserted into the first tubular member as shown in FIGS. 5 and 6.

A resilient ring 80, preferably an O-ring, is carried or retained in the rectangular shaped groove 68 of the second tubular member 54 during assembly or disassembly of the tubular members 52 and 54. The axial length of the groove 68 is greater than the diameter of the O-ring to permit the O-ring to be compressed upon insertion of the second tubular member 54 into the first tubular member 52, but when the two grooves 68 and 70 are opposed to one another the cumulative radial dimension anywhere along an axis of the grooves is small enough to still exert compressive forces onto O-ring 80.

As shown in FIG. 6, when the second tubular member 54 is properly telescoped within the first tubular member 52, triplanar forces are created on the O-ring at the approximate positions indicated by the arrows by engagement of the O-ring with the diverging wall 72 of the first tubular member 52, the radial wall 69 of the groove 68 in the second tubular member as well as engagement with the bottom wall 73 of groove 68. Since the wall 72 is diverging, a resultant force R is created by the resilient O-ring seeking to expand, and this resultant force urges the second tubular member 54 inwardly of the first tubular member 52 until such time either a metal-to-metal seal is made at 58 or a seal is made by the O-ring 58' between the annular enlargement 66 and the end of the first tubular member 52. This arrangement results in the bushing or second tubular member 54 being tightly held in the first tubular member once assembled and, thus, no debris or dirt can enter between the seal 58 and the O-ring 80. However, since the diverging surface or wall 72 of the groove 70 is facing inwardly of the joint, the tubular member 54 may be removed axially from the tubular member 52 as the wall 72 cams the O-ring 80 into compression solely within the groove 68.

The coupling joint of the present invention has utility, particularly in fluid distribution systems, as the bushing or second tubular member 54 may be removed and replaced, or it may be removed to permit servicing of a valve if the coupling joint is used in such an environment. It has been found that the angle for the diverging wall 72 should be an acute angle in a range of 4° to 45°, and preferably no more than 36°, to permit ease of disassembly and yet still retain the camming action of the diverging surface in holding the two tubular members tightly together. A preferred acute angle for the wall 72 which provides good sealing and ease of disassembly for a joint having standard manufacturing tolerances is in the order of 18°.

As shown in FIGS. 4 to 6, inclusive, the diverging wall 72 of the first tubular member is frusto-conical. However, in FIG. 7 a modification is shown where the diverging wall 72' of the groove 70' of the first tubular member 52' includes a first frusto-conical wall portion 82 extending at a predetermined acute angle to the common axis of the first and second tubular members 52' and 54', the wall portion 82 being contiguous with a second frusto-conical wall portion 84 extending at a greater acute angle to the common axis of the tubular members. Again, in the modification shown in FIG. 7, the diverging wall 72' made up by the wall portions 82 and 84 faces inwardly to permit the second tubular member 54' to be removed from the first tubular member 52' and yet still provide resultant forces on the tubular members which urge the tubular members in such a way that the second tubular member tends to move inwardly of the first tubular member.

FIG. 8 shows another modification wherein the diverging wall portion 72" of the groove 70" of the first tubular portion 52" is convexly curved and is facing inwardly of the coupling joint. Again, triplanar forces are exerted on the O-ring 80 when positioned in the opposed grooves with a resultant force tending to move the second tubular member inwardly of the first tubular member.

FIG. 9 dislcoses a still further modification of the present invention in that in this modification the joint is provided with the O-ring retaining groove 68''' in the first tubular member 52''', this being the groove which is rectangular in axial cross-section. It is still desired for the O-ring to exert resultant forces on the tubular members 52''' and 54''' so that the member 54''' is urged inwardly of the member 52''' and, consequently, the groove 70''' found in this modification on the second tubular member 54''' has the diverging wall 72''', but it will be noted that it faces outwardly of the coupling joint so as to permit the members to be disassembled. In the arrangement shown in FIG. 9, the O-ring 80 is retained in the first tubular member 52''' during both assembly and disassembly of the tubular members. Also, it should be noted at this time, the arrangements shown in FIG. 7 or 8 can be modified similar to FIG. 9 so long as the diverging wall or camming surface is facing in the proper direction.

While the bushing or tubular member 54 and the modifications of the same are preferably made of a metal, such as brass or steel, they may also in the environment of the present invention be molded from a hard plastic material such as Teflon. A plastic material could not be satisfactorily used in situations such as found in the prior art and described with respect to FIGS. 1 to 3, or with respect to the Ford U.S. Pat. No. 2,993,677 wherein the bushing was either expanded or press fitted into the outer or first tubular member.

The terminology used in this specification is for the purpose of description and not limitation, the scope of the invention being defined by the claims.

What is claimed is:

1. A coupling joint for telescoping tubular members of a fluid distribution system comprising:
   a first tubular member having an end;
   a second tubular member having a portion inserted within the end of said first tubular member, said first and second tubular members having a common axis;

stop means on one of said first tubular member and said second tubular member to limit insertion of said portion of said second tubular member within the end of said first tubular member;

a first annular groove on one of said first and second tubular members, said first annular groove being rectangular in cross-sectional shape;

a second annular groove in the other of said first and second tubular members opposing said first annular groove when said first and second tubular members are in telescoping relationship, said second annular groove having an annular wall diverging at an acute angle to the common axis of said first and second tubular members;

a resilient O-ring carried in said first groove when said first and second members are telescoped together, said O-ring having a radial section when unstressed of greater diameter than a depth of said first groove, and said first groove having a cross-sectional area in a radial plane containing said common axis of sufficient size to accept said O-ring when said O-ring is compressed upon insertion of said second tubular member into said first tubular member, said O-ring having a portion thereof received in said second annular groove when said first and second annular grooves oppose one another, and said first and second annular grooves, when opposed to each other and when said stop means has limited insertion of said portion of said second tubular member within the end of said first tubular member, having a cumulative radial dimension anywhere along and normal to a longitudinal axis of the grooves less than the unstressed diameter of the radial section of said O-ring to cause continuous compressive forces to be exerted on said O-ring by said first annular groove and by at least the diverging wall of said second annular groove; and said diverging annular wall of said second annular groove facing in an axial direction of said first and second tubular members which causes said O-ring being continuously compressed between said first and second annular grooves, to seek to expand and to exert resultant forces on said first and second tubular members urging said second tubular member inwardly of said first tubular member against said stop means.

2. A coupling joint as claimed in claim 1 including sealing means between said first and second tubular members positioned axially outwardly of said O-ring.

3. A coupling joint as claimed in claim 2 in which said sealing means is urged into sealing engagement by the resultant forces on said first and second tubular members urging said second tubular member inwardly of said first tubular member.

4. A coupling joint as claimed in claim 3 in which said second tubular member has an end portion projecting from said first tubular member, said end portion having an annular engagement thereon defining said stop means and being of a greater diameter than an interior diameter of said first tubular member and in which said sealing means includes a seal caused by engagement of said annular enlargement with an end of said first tubular member.

5. A coupling joint as claimed in claim 4 in which the first and second tubular members are made of metal and in which said seal is a metal-to-metal seal.

6. A coupling joint as claimed in claim 3 in which said second tubular member has an end portion projecting from said first tubular member, said end portion having an annular enlargement thereon defining said stop means and being of a greater diameter than an interior diameter of said first tubular member and in which said sealing means includes a resilient O-ring positioned between said annular enlargement and the end of said first tubular member.

7. A coupling joint as claimed in claim 3 in which said first annular groove is positioned on the exterior of said second tubular member, and in which said diverging annular wall of said second annular groove faces inwardly from the end of said first tubular member when said first and second tubular members are in telescoping relationship.

8. A coupling joint as claimed in claim 7 in which said diverging annular wall is frusto-conical.

9. A coupling joint as claimed in claim 7 in which said diverging annular wall is convexly curved.

10. A coupling joint as claimed in claim 7 in which said diverging annular wall includes a first frusto-conical wall portion extending at a predetermined acute angle to the common axis of said first and second tubular members, and a second frusto-conical portion continuous with said first frusto-conical wall portion and extending at a greater acute angle to the common axis of said first and second tubular members.

11. A coupling joint as claimed in claim 7 wherein said first annular groove includes an inwardly facing radial wall, an outwardly facing radial wall, and a bottom wall when said first and second tubular members are in telescoping relationship, and wherein said O-ring, when carried in said first groove and said second groove, engages and exerts a force individually on each of the diverging wall of said second groove, the bottom wall and the outwardly facing wall of said first groove to thereby cause said resulting forces on said first and second tubular members to urge said second tubular member inwardly of said first tubular member.

12. A coupling joint as claimed in claim 7 in which the diverging annular wall of said second annular groove extends at an acute angle to said common axis in a range of 4° into 45°.

13. A coupling joint as claimed in claim 12 in which said acute angle is no greater than 36°.

14. A coupling joint as claimed in claim 7 in which said second annular groove has an axial dimension greater than an axial dimension of said first annular groove.

15. A coupling joint as claimed in claim 7 in which the diverging annular wall of said second annular groove extends at an acute angle to said common axis in the order of 18°.

16. A coupling joint as claimed in claim 3 in which said first annular groove is positioned on the interior of said first tubular member and in which said second annular groove is positioned on the exterior of said second tubular member, said diverging annular wall of said second annular groove facing outwardly toward the end of said first tubular member when said first and second tubular members are in telescoping relationship.

17. A coupling joint as claimed in claim 16 in which said diverging annular wall is frusto-conical.

18. A coupling joint as claimed in claim 17 wherein said first annular groove includes an inwardly facing radial wall, an outwardly facing radial wall, and a bottom wall when said first and second tubular members are in telescoping relationship and wherein said O-ring, when carried in said first groove and said second groove engages and exerts a force individually on each of the diverging wall of said second groove, the bottom wall and inwardly facing wall of said first groove to thereby cause said resulting forces on said first and second tubular members to urge said second tubular member inwardly of said first tubular member.

19. A coupling joints as claimed in claim 18 in which the diverging annular wall of said second annular groove extends at an acute angle to said common axis in a range of 4° to 45°.

20. A coupling joint as claimed in claim 19 in which said acute angle is no greater than 36°.

21. A coupling joint as claimed in claim 16 in which the diverging annular wall of said second annular groove extends at an acute angle to said common axis in the order of 18°.

22. A coupling joint as claimed in claim 1 including sealing means between said first and second tubular members positioned outwardly of said O-ring, said sealing means including an annular enlargement defining said stop means, said enlargement being on the end portion of said second tubular member, said annular enlargement being greater in diameter than an interior diameter of said first tubular member, and a seal caused by operative engagement of said annular enlargement with the end of said first tubular member, said coupling joint further including exterior threads on the end of said first tubular member, a pipe having a flared end, a tubular coupling nut for receiving said flared end of said pipe, said tubular coupling nut having interior threads for mating with the threads of said coupling nut whereby said coupling nut can draw the flared end of said pipe into sealing engagement with said annular enlargement on said second tubular member.

23. A coupling joint as claimed in claim 22 in which said first tubular member is a portion of a valve having a valve element therein insertable through said first tubular member prior to insertion of said second tubular member.

24. A coupling joint for telescoping tubular members of a fluid distribution system comprising:
a first tubular member;
a second tubular member having a portion inserted within said first tubular member;
stop means on one of said first tubular member and said second tubular member to limit insertion of said portion of said second tubular member into said first tubular member;
a first annular groove on one of said tubular members and a second annular groove on the other of said tubular members, said first and second annular grooves being arranged to oppose one another when said first and second tubular members are in telescoping relationship;
a resilient O-ring positioned in said first and second annular grooves when the same are opposed to one another for retaining said tubular members in telescoping relationship, said first and second annular grooves, when opposed to each other and when said stop means has limited insertion of said portion of said second tubular member within the end of said first tubular portion, having a cumulative radial dimension anywhere along and normal to a longitudinal axis of the grooves less than the unstressed diameter of a radial section of said resilient O-ring to cause continuous compressive forces to be exerted on said resilient ring by both said first and second annular grooves; and
a camming surface in one of said grooves engaging said resilient O-ring and causing the continuously compressed resilient O-ring to seek to expand and to exert resultant forces on said first and second tubular members urging the same in an axial direction relative one another against said stop means.

25. A coupling joint as claimed in claim 24 in which said second tubular member is provided with an annular enlargement thereon defining said stop means and being of a greater diameter than an interior diameter of said first tubular member and including sealing means between said annular enlargement and an end of said first tubular member.

26. A coupling joint as claimed in claim 25 in which said camming surface in one of said grooves includes a diverging annular wall in the annular groove of said first tubular member facing in a direction away from the annular enlargement on said second tubular member.

* * * * *